United States Patent
Gonion

(10) Patent No.: US 9,715,386 B2
(45) Date of Patent: Jul. 25, 2017

(54) CONDITIONAL STOP INSTRUCTION WITH ACCURATE DEPENDENCY DETECTION

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 14/688,043

(22) Filed: Apr. 16, 2015

(65) Prior Publication Data

US 2016/0092218 A1    Mar. 31, 2016

Related U.S. Application Data

(60) Provisional application No. 62/056,691, filed on Sep. 29, 2014.

(51) Int. Cl.
  *G06F 9/30* (2006.01)
(52) U.S. Cl.
  CPC ........ *G06F 9/30036* (2013.01); *G06F 9/3004* (2013.01)
(58) Field of Classification Search
  None
  See application file for complete search history.

(56) References Cited

U.S. PATENT DOCUMENTS

| | | |
|---|---|---|
| 5,349,692 A | 9/1994 | Nishi |
| 5,381,536 A | 1/1995 | Phelps et al. |
| 5,499,350 A | 3/1996 | Uchida et al. |
| 5,781,752 A | 7/1998 | Moshovos et al. |
| 5,802,375 A | 9/1998 | Ngo et al. |
| 5,953,241 A | 9/1999 | Hansen et al. |
| 6,044,222 A | 3/2000 | Simons et al. |
| 6,115,808 A | 9/2000 | Arora |
| 6,154,153 A | 11/2000 | Kubota |
| 6,178,500 B1 | 1/2001 | Roth |
| 6,295,599 B1 | 9/2001 | Hansen et al. |
| 6,308,250 B1 | 10/2001 | Klausler |
| 6,308,259 B1 | 10/2001 | Witt |

(Continued)

OTHER PUBLICATIONS

Beletshyy, V., A Correction Method for Parallel Loop Execution, 2002, Springer-Verlag pp. 409-418.

(Continued)

*Primary Examiner* — Eric Coleman
(74) *Attorney, Agent, or Firm* — Meyertons, Hood, Kivlin, Kowert & Goetzel, P.C.; Lawrence J. Merkel

(57) ABSTRACT

In an embodiment, a processor may implement a conditional stop instruction that includes a first predicate vector identifying the active elements of the instruction, a second predicate vector indicating true and false results for a conditional expression within a loop that is being vectorized, and a source operand specifying which combinations in the true and false results may indicate a dependency. The conditional stop instruction may generate a vector result indicating vector elements that have a dependency on a prior vector element, as well as an identification of which element position the dependency is on. More particularly, dependencies may be detected only on active elements as indicated by the first predicate vector. False dependencies that may occur due to inactive elements may be avoided, which may improve performance and/or provide for correct functional operation.

16 Claims, 8 Drawing Sheets

(56) References Cited

U.S. PATENT DOCUMENTS

| | | | |
|---|---|---|---|
| 6,360,316 B1 * | 3/2002 | Baraz | G06F 9/30072 712/214 |
| 6,571,386 B1 | 5/2003 | Figurin et al. | |
| 6,584,482 B1 | 6/2003 | Hansen et al. | |
| 6,643,765 B1 | 11/2003 | Hansen et al. | |
| 6,725,356 B2 | 4/2004 | Hansen et al. | |
| 6,993,756 B2 | 1/2006 | Ogawa et al. | |
| 7,100,026 B2 | 8/2006 | Dally et al. | |
| 7,194,606 B2 | 3/2007 | Bhushan et al. | |
| 7,213,131 B2 | 5/2007 | Hansen et al. | |
| 7,216,217 B2 | 5/2007 | Hansen et al. | |
| 7,260,708 B2 | 8/2007 | Hansen et al. | |
| 7,301,541 B2 | 11/2007 | Hansen et al. | |
| 7,321,369 B2 | 1/2008 | Wyatt et al. | |
| 7,353,367 B2 | 4/2008 | Hansen et al. | |
| 7,395,419 B1 | 7/2008 | Gonion | |
| 7,430,655 B2 | 9/2008 | Hansen et al. | |
| 7,434,036 B1 * | 10/2008 | Wichman | G06F 9/30072 712/234 |
| 7,464,252 B2 | 12/2008 | Hansen et al. | |
| 7,509,366 B2 | 3/2009 | Hansen | |
| 7,516,308 B2 | 4/2009 | Hansen et al. | |
| 7,571,301 B2 | 8/2009 | Kejariwal et al. | |
| 7,617,496 B2 | 11/2009 | Gonion | |
| 7,620,797 B2 | 11/2009 | Gonion et al. | |
| 7,624,251 B2 | 11/2009 | Gonion et al. | |
| 7,653,806 B2 | 1/2010 | Hansen et al. | |
| 7,660,972 B2 | 2/2010 | Hansen et al. | |
| 7,660,973 B2 | 2/2010 | Hansen et al. | |
| 7,712,091 B2 | 5/2010 | Muthukumar et al. | |
| 7,730,287 B2 | 6/2010 | Hansen et al. | |
| 7,739,442 B2 | 6/2010 | Gonion | |
| 7,793,084 B1 * | 9/2010 | Mimar | G06F 9/30021 712/236 |
| 7,975,134 B2 | 7/2011 | Gonion et al. | |
| 8,019,976 B2 | 9/2011 | Gonion et al. | |
| 8,019,977 B2 | 9/2011 | Gonion et al. | |
| 8,060,728 B2 | 11/2011 | Gonion et al. | |
| 8,078,847 B2 | 12/2011 | Gonion et al. | |
| 8,131,979 B2 * | 3/2012 | Gonion | G06F 8/4441 712/216 |
| 8,176,299 B2 | 5/2012 | Gonion et al. | |
| 8,181,001 B2 | 5/2012 | Gonion et al. | |
| 8,271,832 B2 | 9/2012 | Gonion et al. | |
| 8,356,159 B2 | 1/2013 | Gonion et al. | |
| 8,356,164 B2 | 1/2013 | Gonion et al. | |
| 8,359,460 B2 | 1/2013 | Gonion et al. | |
| 8,359,461 B2 | 1/2013 | Gonion et al. | |
| 8,364,938 B2 | 1/2013 | Gonion et al. | |
| 8,370,608 B2 | 2/2013 | Gonion et al. | |
| 8,402,255 B2 | 3/2013 | Gonion et al. | |
| 8,412,914 B2 | 4/2013 | Gonion | |
| 8,417,921 B2 | 4/2013 | Gonion et al. | |
| 8,433,883 B2 | 4/2013 | Greyzck et al. | |
| 8,447,956 B2 | 5/2013 | Gonion et al. | |
| 8,464,031 B2 | 6/2013 | Gonion | |
| 8,484,443 B2 | 7/2013 | Gonion | |
| 8,504,806 B2 | 8/2013 | Gonion | |
| 8,527,737 B2 | 9/2013 | Gonion | |
| 8,527,742 B2 | 9/2013 | Gonion | |
| 8,539,205 B2 | 9/2013 | Gonion | |
| 9,519,479 B2 * | 12/2016 | Le | G06F 9/30018 |
| 2002/0144098 A1 | 10/2002 | Wang et al. | |
| 2004/0230960 A1 | 11/2004 | Nair et al. | |
| 2005/0278514 A1 * | 12/2005 | Wilson | G06F 9/30094 712/234 |
| 2007/0169059 A1 | 7/2007 | Halambi et al. | |
| 2008/0016320 A1 * | 1/2008 | Menon | G06F 9/30014 712/22 |
| 2010/0325483 A1 * | 12/2010 | Gonion | G06F 8/4441 714/10 |
| 2012/0191950 A1 | 7/2012 | Gonion | |
| 2013/0275724 A1 | 10/2013 | Bharadwaj | |

OTHER PUBLICATIONS

Pugh, William, The Omega Test: a fast and practical integer programming algorithm for dependence analysis, 1991 ACM, pp. 4-13.

Goff, G, etal., Practical Dependence Testing, 1991, ACM, Proc. of the ACM SIGPLAN 91' Conf. on Prog. Lang. Design and implementations pp. 15-29.

Callahan, D. etal., Analysis of Event Synchronization in a Parallel Programming Tool , 1990, ACM pp. 21-30.

* cited by examiner

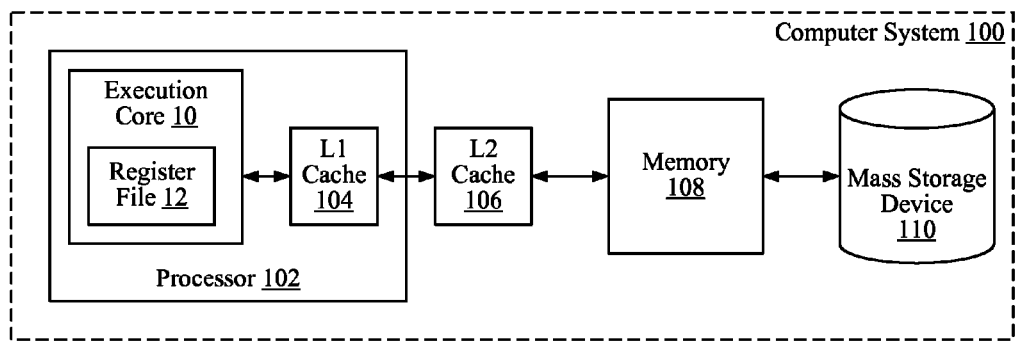
Fig. 1
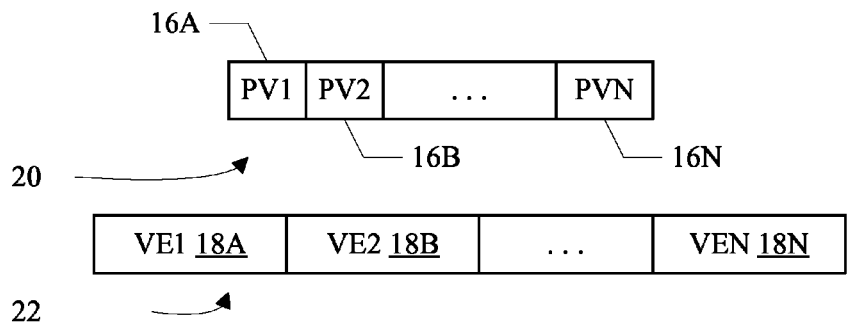
Fig. 2
Dest = ConditionalStop(p1, src1, p2)
Fig. 3

| Combination | Meaning |
|---|---|
| kTF | LCD from true predicate to subsequent false predicate |
| kFF | LCD from false predicate to subsequent false predicate |
| kFT | LCD from false predicate to subsequent true predicate |
| kTT | LCD from true predicate to subsequent true predicate |

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

Fig. 7A

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] | | | 9 | 1 | 17 | 19 | 15 | 30 |
| B[x] = | 20 | 37 | 26 | 18 | 34 | 36 | 32 | 47 |

Fig. 7B

Source Code

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

Fig. 8A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

Fig. 8B

Example 2A
Vectorized
(Non-Speculative)

```
        j = 0;
        x = VectorIndex (0,1) ;
        goto Loop1Tail;
     Loop1:
        p3 = 0;
        j = PropagatePriorF (j, p0) ;
        ~p0; t = VectorReadInt (A, x) ;
        p1 = t < FACTOR;
        p2 = ConditionalStop (p1, kTT | kTF) ;
     Loop2:
        t = x + j ;
        !p0; p3 = GeneratePredicates (p3, p2) ;
        ~p3; t = VectorTest (p1) ;
        if ( NONE () ) goto Loop2Tail ;
        !p3; p4 = p1 + 0;
        ~p4; j = VectorRead (A, t) ;
        j = PropagatePostT (j, j, p4) ;
     Loop2Tail:
        if ( !CARRY () ) goto Loop2
        ~p0; VectorWrite (B, x, j) ;
        x += VECLEN;
     Loop1Tail:
        p0 = (x < KSIZE) ;
        if ( FIRST () ) goto Loop1;
```

Fig. 9A

Example 2B
Vectorized
(Speculative)

```
        j = 0;
        x = VectorIndex (0,1) ;
        goto Loop1Tail ;
     Loop1:
        p3 = 0 ;
        j = PropagatePriorF (j, p0) ;
     Loop2:
        !p0; p5 = Remaining (p3) ;
        ~p5; t = x + j ;
        ~p5; t = VectorReadIntFF (A, t, ps) ;
        ~p5; p5 &= ps ;
        ~p5; p1 (t < FACTOR) ;
        !p5; i2 = ConditionalStop (p1, kTT | kTF) ;
        !p0; p3 = GeneratePredicates (p3, i2) ;
        ~p3; VectorTest (p1) ;
        ~p3; if (NONE () ) goto Loop2Tail ;
        !p3; p4 = p1 + 0 ;
        ~p4; j = VectorRead (A, x) ;
        j = PropagatePostT (j, j, p4) ;
     Loop2Tail:
        ~p0; VectorTest (p3) ;
        if ( !LAST () ) goto Loop2 ;
        ~p0; VectorWrite (B, x, j) ;
        x += VECLEN ;
     Loop1Tail:
        p0 = (x < KSIZE) ;
        if ( FIRST () ) goto Loop1 ;
```

Fig. 9B

Example 3
Vectorized

```
        x = VectorIndex (0,1) ;
        goto Loop1Tail ;
Loop1:
        ~p0; r = VectorReadInt(C,x);
        ~p0; s = VectorReadInt (D, x) ;
        i1 = CheckHazardP(r,x,p0);
        i2 = CheckHazardP(s,x,p0);
        i3 = VectorMax(i1,i2);
        p4 = 0 ;
Loop2:
        ~p0; p4 = GeneratePredicates (p4, i3) ;
        ~p4; t1 = VectorReadInt(A,r) ;
        ~p4; t2 = VectorReadInt(A,s);
        ~p4; t3 = t1 + t2 ;
        ~p4; VectorWriteInt(A,x,t3);
        ~p0; if (!CARRY( )) goto Loop2;
        x += VECLEN;
Loop1Tail:
        p0 = (x < KSIZE) ;
        if ( FIRST (p0) ) goto Loop1 ;
```

Fig. 10

Example 4
Vectorized

```
        x = VectorIndex (0,1) ;
        goto Loop1Tail ;
Loop1:
        j = PropagatePriorF(j,p0);
        ~p0; f = VectorReadInt(A,x);
        ~p0; g = VectorReadInt (B, x) ;
        !p0; p1 = (f < FACTOR);
        !p0; p2 = (g < FACTOR);
        ~p1; h = VectorReadInt(C,x);
        ~p2; i = VectorReadInt(D,x);
        !p1; ix = CheckHazardP(h,i,p2);
        p3 = 0 ;
Loop2:
        p3 = GeneratePredicates (p3, ix) ;
        !p3; p4 = p1 + 0;
        !p3; p5 = p2 + 0;
        ~p4; j = VectorReadInt(E,h);
        j = CopyPropagate(j,j,p4);
        ~p5; VectorWriteInt(E,i,j);
        ~p0; if (!LAST(p3)) goto Loop2;
        x += VECLEN;
Loop1Tail:
        p0 = (x < KSIZE) ;
        if ( FIRST (p0) ) goto Loop1 ;
```

Fig. 11

CONDITIONAL STOP INSTRUCTION WITH ACCURATE DEPENDENCY DETECTION

This application claims benefit of priority to U.S. Provisional Patent Application Ser. No. 62/056,691, filed on Sep. 29, 2014. The above application is incorporated herein by reference in its entirety. To the extent that anything in the above application conflicts with material expressly set forth herein, the material expressly set forth herein controls.

BACKGROUND

Technical Field

Embodiments described herein are related to the field of processors and, more particularly, to processors that execute predicated vector operations.

Description of the Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

Conditional loop-carried dependencies (LCDs) complicate the vectorization of loops. An LCD is a dependency of a variable in a loop on a variable that is modified in a previous iteration of the loop. For example, a variable that is both a source and a destination of instructions in a loop can be an LCD. Since the value of the variable as a source in a given iteration of the loop is dependent on the result from the previous iteration of the loop, an LCD exists. Some LCDs are conditional, meaning that a dependency exists if a conditional expression evaluates in a certain way between iterations, but does not exist if a conditional expression evaluates in a different way between iterations. For example, instructions that are executed only if a condition is true can create a dependency in iterations where the condition evaluates to true but no dependency in iterations where the condition evaluates to false. Many possibilities for dependencies exist based on the evaluation of the expression in a previous iteration and the evaluation of the expression in the current iteration.

SUMMARY

In an embodiment, a processor may implement a vector instruction set including a conditional stop instruction. The conditional stop instruction may include a first predicate vector identifying the active elements of the instruction, a second predicate vector indicating true and false results for a conditional expression within a loop that is being vectorized, and a source operand specifying which combinations in the true and false results may indicate a dependency. The conditional stop instruction may generate a vector result indicating vector elements that have a dependency on a prior vector element, as well as an identification of which element position the dependency is on. In one embodiment, the vector result may be a dependency index vector (DIV). If a DIV element is zero, the corresponding vector element has no LCD. If the DIV element is non-zero, the corresponding vector element has an LCD on the prior element position indicated by the numerical value of the DIV element. More particularly, dependencies may be detected only on active elements as indicated by the first predicate vector. False dependencies that may occur due to inactive elements may be avoided, which may improve performance and/or provide for correct functional operation.

BRIEF DESCRIPTION OF THE DRAWINGS

The following detailed description makes reference to the accompanying drawings, which are now briefly described.

FIG. 1 is a block diagram of one embodiment of a computer system.

FIG. 2 is a block diagram of one embodiment of a predicate vector register and a vector register.

FIG. 3 illustrates an embodiment of a conditional stop instruction.

FIG. 7A is a diagram illustrating a sequence of variable states during scalar execution of the loop shown in Example 1.

FIG. 7B is a diagram illustrating a progression of execution for Macroscalar vectorized program code of the loop of Example 1.

FIG. 8A and FIG. 8B are diagrams illustrating one embodiment of the vectorization of program source code.

FIG. 9A is a diagram illustrating one embodiment of non-speculative vectorized program code.

FIG. 9B is a diagram illustrating another embodiment of speculative vectorized program code.

FIG. 10 is a diagram illustrating one embodiment of vectorized program code.

FIG. 11 is a diagram illustrating another embodiment of vectorized program code.

Figures 4, 5:
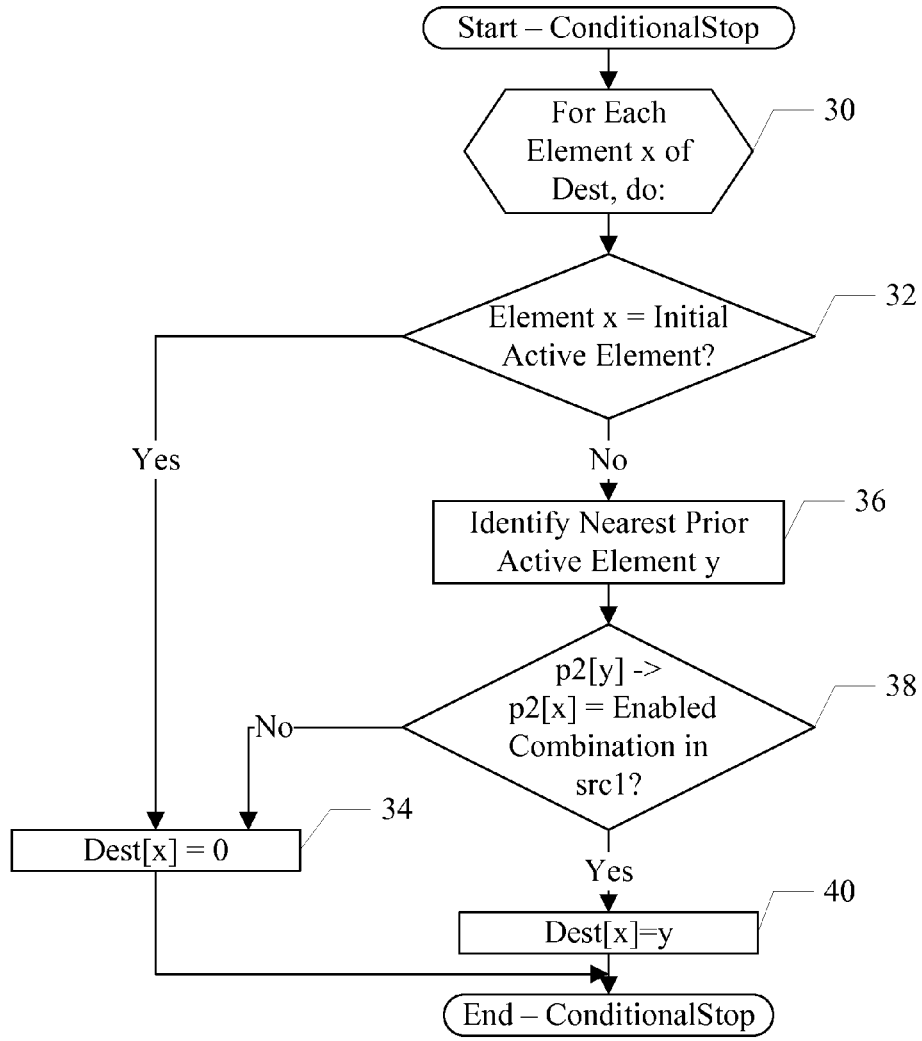
FIG. 4 is a flow chart illustrating operation of one embodiment of a processor to execute a conditional stop instruction.
FIG. 5 is a table illustrating predicate vector transitions that may be specified as dependencies for one embodiment of the conditional stop instruction.

While the embodiments described herein are susceptible to various modifications and alternative forms, specific embodiments thereof are shown by way of example in the drawings and will herein be described in detail. It should be understood, however, that the drawings and detailed description are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104 and an execution core 10 coupled to the L1 cache 104. The execution core 10 includes a register file 12 as shown. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Multiple processors similar to the processor 102 may be included. Additionally, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, the processor 102 may be representative of a general-purpose processor that performs computational operations. For example, the processor 102 may be a central processing unit (CPU) such as a microprocessor, a microcontroller, an application-specific integrated circuit (ASIC), or a field-programmable gate array (FPGA). The processor 102 may include one or more mechanisms for vector processing (e.g., vector execution units). The processor 102 may be a standalone component, or may be integrated onto an integrated circuit with other components (e.g. other processors, or other components in a system on a chip (SOC)). The processor 102 may be a component in a multichip module (MCM) with other components.

More particularly, as illustrated in FIG. 1, the processor 102 may include the execution core 10. The execution core 10 may be configured to execute instructions defined in an instruction set architecture implemented by the processor 102. The execution core 10 may have any microarchitectural features and implementation features, as desired. For example, the execution core 10 may include superscalar or scalar implementations. The execution core 10 may include in-order or out-of-order implementations, and speculative or non-speculative implementations. The execution core 10 may include any combination of the above features. The implementations may include microcode, in some embodiments. The execution core 10 may include a variety of execution units, each execution unit configured to execute operations of various types (e.g. integer, floating point, vector, multimedia, load/store, etc.). The execution core 10 may include different numbers pipeline stages and various other performance-enhancing features such as branch prediction. The execution core 10 may include one or more of instruction decode units, schedulers or reservations stations, reorder buffers, memory management units, I/O interfaces, etc.

The register file 12 may include a set of registers that may be used to store operands for various instructions. The register file 12 may include registers of various data types, based on the type of operand the execution core 10 is configured to store in the registers (e.g. integer, floating point, multimedia, vector, etc.). The register file 12 may include architected registers (i.e. those registers that are specified in the instruction set architecture implemented by the processor 102). Alternatively or in addition, the register file 12 may include physical registers (e.g. if register renaming is implemented in the execution core 10).

The L1 cache 104 may be illustrative of any caching structure. For example, the L1 cache 104 may be implemented as a Harvard architecture (separate instruction cache for instruction fetching by the fetch unit 201 and data cache for data read/write by execution units for memory-referencing ops), as a shared instruction and data cache, etc. In some embodiments, load/store execution units may be provided to execute the memory-referencing ops.

An instruction may be an executable entity defined in an instruction set architecture implemented by the processor 102. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 102. Some instructions may be microcoded, in some embodiments. Accordingly, the term "instruction operation" may be used herein to refer to an operation that an execution unit in the processor 102/execution core 10 is configured to execute as a single entity. Instructions may have a one to one correspondence with instruction operations, and in some cases an instruction operation may be an instruction (possibly modified in form internal to the processor 102/execution core 10). Instructions may also have a one to more than one (one to many) correspondence with instruction operations. An instruction operation may be more briefly referred to herein as an "op."

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage media.

As mentioned above, the execution core 10 may be configured to execute vector instructions. The vector instructions may be defined as single instruction-multiple-data (SIMD) instructions in the classical sense, in that they may define the same operation to be performed on multiple data elements in parallel. The data elements operated upon by an instance of an instruction may be referred to as a vector. However, it is noted that in some embodiments, the vector instructions described herein may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.).

In one embodiment, the register file 12 may include vector registers that can hold operand vectors and result vectors. In some embodiments, there may be 32 vector registers in the vector register file, and each vector register may include 128 bits. However, in alternative embodiments, there may be different numbers of vector registers and/or different numbers of bits per register. The vector registers may further include predicate vector registers that may store predicates for the vector instructions. Furthermore, embodiments which implement register renaming may include any number of physical registers that may be allocated to architected vector registers and architected predicate vector registers. Architected registers may be registers that are specifiable as operands in vector instructions.

In one embodiment, the processor 102 may support vectors that hold N data elements (e.g., bytes, words, doublewords, etc.), where N may be any positive whole number. In these embodiments, the processor 102 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of the processor 102.

In some embodiments, as described in greater detail below, based on the values contained in a vector of predicates or one or more scalar predicates, the processor 102 applies vector operations to selected vector data elements only. In some embodiments, the remaining data elements in a result vector remain unaffected (which may also be referred to as "masking" or "masking predication") or are forced to zero (which may also be referred to as "zeroing" or "zeroing predication"). In some embodiments, the clocks for the data element processing subsystems ("lanes") that are unused due to masking or zeroing in the processor 102 can be power and/or clock-gated, thereby reducing dynamic power consumption in the processor 102. Generally a predicate may refer to a value that indicates whether or not an operation is to be applied to a corresponding operand value to produce a result. A predicate may, e.g., be a bit indicating that the operation is to be applied in one state and not applied in the other state. For example, the set state may indicate that the operation is to be applied and the clear state may indicate that the operation is not to be applied (or vice versa). A vector element to which the operation is to be applied as indicated in the predicate is referred to as an active vector element. A vector element to which the operation is not to be applied as indicated in the predicate is referred to as an inactive vector element.

In various embodiments, the architecture may be vector-length agnostic to allow it to adapt to parallelism at runtime. More particularly, when instructions or ops are vector-length agnostic, the operation may be executed using vectors of any length. A given implementation of the supporting hardware may define the maximum length for that implementation. For example, in embodiments in which the vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware. In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In an embodiment, the predicate vector registers may be architected to store predicate vectors, and the vector registers may store vector elements (N elements, where N is implementation-specific). FIG. 2 is a block diagram illustrating an exemplary predicate vector register 20 and an exemplary vector register 22 as architected according to one embodiment of the instruction set architecture implemented by the processor 102. As illustrated in FIG. 2, the predicate vector register 20 includes N predicate fields 16A-16N. The N predicate fields correspond to the N vector element fields 18A-18N of the vector register 22.

The instruction set implemented by the processor 102 may include conditional stop instructions. An example embodiment of a conditional stop instruction is illustrated in FIG. 3. The embodiment of FIG. 3 may include predicate vector operands p1 and p2 and source operand src1. The predicate vector operand p1 may specify the active elements of the conditional stop instruction. Inactive elements are not considered in determining the conditional dependencies. The predict vector operand p2 may describe the true/false evaluations of the conditional expression with the loop that causes an LCD to vary from iteration to iteration. A preceding instruction or instructions in a code sequence with the conditional stop instruction may evaluate the conditional expression over the vector to determine p2. The source operand src1 may specify which combinations of true/false results in the predicate vector p2 indicate a dependency. There may be four possible combinations of true and false between a given active vector element and a preceding active vector element: true/true; true/false; false/true; and false/false. In one embodiment, the four possible combinations between true and false may each be specified as a bit in a four bit field in src1. The bit may be set to specify that the combination indicates a dependency; and the bit may be clear to specify that the combination does not indicate a dependency. Other representations of the combinations that indicate dependencies may be used. Any combination of immediate and register operands may be used in various embodiments. For example, in one embodiment, the p1 and p2 operands may be predicate vector registers 20 and the source operand src1 may be an immediate operand. In other embodiments, the source operand src1 may be a scalar register operand. In general, the combinations of true/false results may include both transitions (where the prior element result is either true or false and the subsequent element is the opposite) and true/false results that are the same value (e.g. true for the prior element result and true for the subsequent element result, or false for the prior element result and false for the subsequent element result).

The conditional stop instruction may detect dependencies between the active vector elements specified by the predicate operand p1. That is, inactive elements in the predicate vector p2 may be ignored and each element position in the vector may be checked against the previous active element position for transitions that indicate dependencies. The initial active vector element may have no dependency (even if the initial active vector element is not the initial element of the vector), since each preceding vector element is inactive and therefore may not cause a dependency. For each subsequent active vector element, the dependency determination may be made based on the true/false value for that vector element and the nearest previous active vector element, and further based on the enabled combinations specified by the operand src1. That is, there may be one or more inactive elements between the nearest previous active vector element and the subsequent active vector element. The initial active vector element may be the vector element which, when the vector elements are viewed in order from vector element 1 to vector element N, is an active vector element and each lower-numbered vector element is inactive. The nearest previous active vector element to a given vector element may be the highest-numbered vector element that is active and that is a lower-numbered vector element than the given vector element.

For each element position at which a dependency is detected on the nearest previous active vector element, a vector number is generated identifying the element position of the nearest previous active vector element. The vector number is recorded in the element position at which the dependency is detected in the output vector. For each element position at which no dependency is detected, a zero is recorded in the output vector. Accordingly, the output vector (stored in a destination vector register 22, "Dest" in FIG. 3) may be a vector of element position numbers and zeros. The output vector may be referred to as a dependency index vector (DIV).

The DIV may be processed by subsequent instructions in a variety of fashions. For example, multiple predicate vectors may be generated having active elements that are determined from the DIV. A first predicate vector may specify active elements from position 1 to the first non-zero DIV element position. A second predicate vector may specify active elements from the element position after the first non-zero DIV element position the second non-zero DIV element position. A third predicate vector may specify active elements from the element position after the second non-zero DIV element position to the third non-zero DIV element position, and so on until the DIV is processed. The set of predicate vectors may identify vector elements that may be safely processed in parallel.

FIG. 4 is a flowchart illustrating operation of one embodiment of the processor 102/execution core 10 in response to a conditional stop instruction. While the blocks are shown in a particular order for ease of understanding, other orders may be used. Blocks may be performed in parallel in combinatorial logic in the processor 102/execution core 10. Blocks, combinations of blocks, and/or the flowchart as a whole may be pipelined over multiple clock cycles in the processor 102/execution core 10. Thus, the processor 102/execution core 10 may be configured to implement the operation illustrated in FIG. 4.

As indicated at block 30, the processor 102/execution core 10 may be configured to perform the operations shown in the remainder of the flowchart for each vector element in the source operands and result vector. The operations may be performed in parallel for each vector element, in some embodiments. Alternatively, a combination of parallel and serial operation may be used, or serial operation may be implemented.

If the element x is the initial active element in the vector, as indicated by the predicate p1 (decision block 32, "yes" leg), no dependency is indicated for the vector element position (dest[x]=0, block 34). If the element x is not the initial active element (decision block 32, "no" leg), the nearest prior active element y may be identified based on the predicate p1 (block 36). If the predicate for position y and the predicate for position x indicate a combination that is enabled in the source operand src1 (decision block 38, "yes" leg), the destination vector element at position x may be set to y (the vector element position number of the nearest prior active element) (block 40). A combination may be "enabled" in src1 if it is one of the combinations that is specified in src1 to indicate a dependency between the vector element positions. Finally, if the predicate for position y and the predicate for position x indicate a combination that is not enabled in the source operand src1 (decision block 38, "no" leg), no dependency is indicated for the vector element position (dest[x]=0, block 34).

FIG. 5 is a table 42 indicating the possible combinations in the predicate p2 (between active elements of the predicate as indicated by predicate p1) which indicate a dependency. The nearest prior active element may be either true or false, and the current active element may be either true or false. Each entry in the table 42 may correspond to a bit in the src1 operand, which may be set to enable that combination of true/false results as a dependency transition or clear to indicate no dependency.

Macroscalar Architecture Overview

Various embodiments of an instruction set architecture (referred to as the Macroscalar Architecture) and supporting hardware may allow compilers to generate program code for loops without having to completely determine parallelism at compile-time, and without discarding useful static analysis information, will now be described. The embodiments may include the hazard check instruction described above. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 6.

Figure 6:
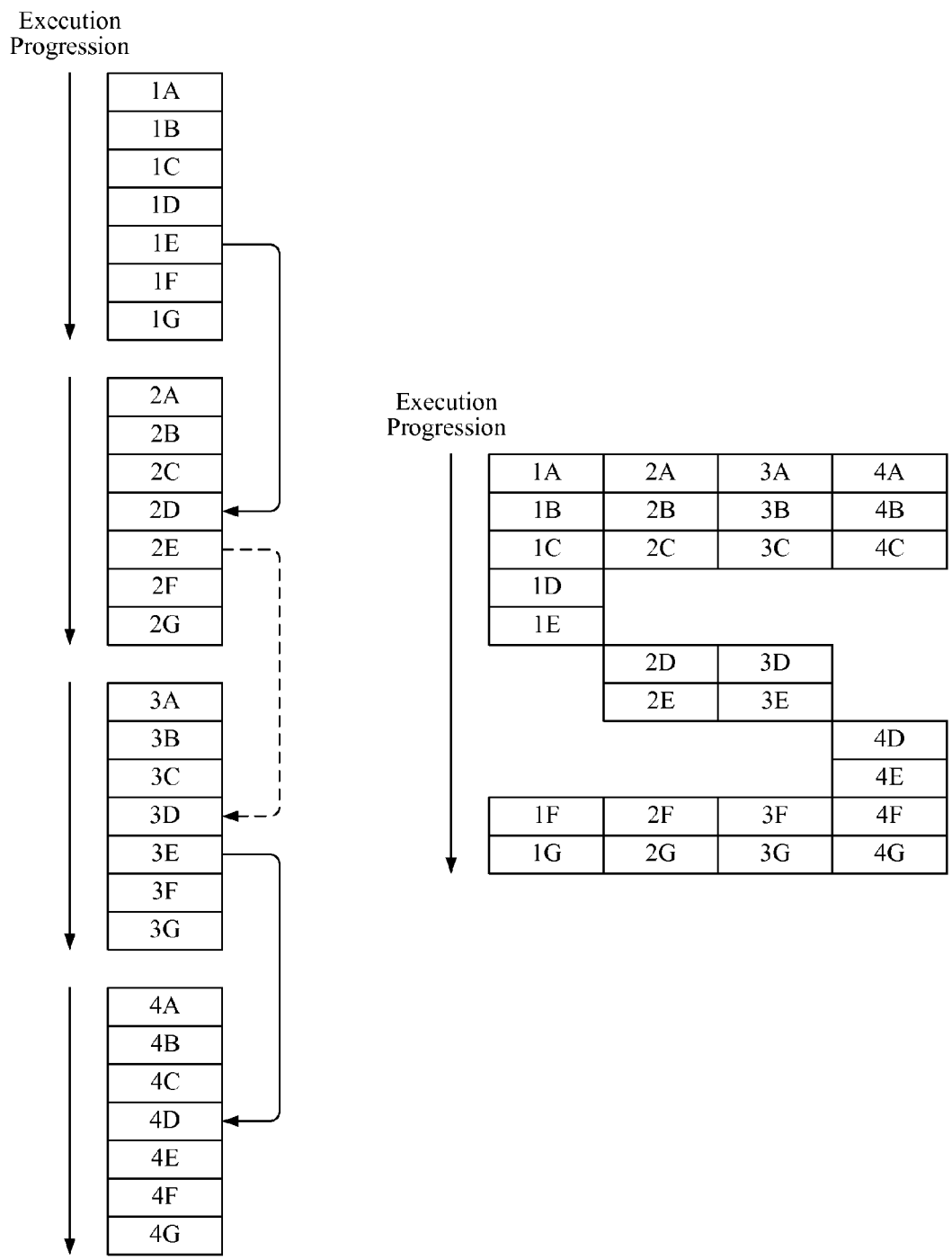
FIG. 6 is a diagram illustrating an example parallelization of a program code loop.

Referring to the left side of FIG. 6, an execution pattern is shown with four iterations (e.g., iterations 1-4) of a loop that have not been parallelized, where each loop includes instructions A-G. Serial operations are shown with instructions vertically stacked. On the right side of FIG. 6 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 6, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 6 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b.

Note that vector p5 may be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

if (FIRST( ) goto . . . ; // Also LAST( ), ANY( ), ALL( ), CARRY( ), ABOVE( ), or NONE( ), (where ANY( )==!NONE( ))

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

| Program Code Loop |
| --- |
| r = 0;<br>s = 0;<br>for (x=0; x<KSIZE; ++x)<br>{<br>    if (A[x] < FACTOR)<br>    {<br>        r = A[x+s];<br>    }<br>    else<br>    {<br>        s = A[x+r];<br>    }<br>    B[x] = r + s;<br>} |

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=Vectorindex(Start, Increment)

Vectorindex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); // x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

Entry: dest={8 9A B C D E F}
 src={1 2 3 4 5 6 7 8}
 pred={0 0 1 1 0 0 1 0}
Exit: dest={8 9 A B 4 4 E 7} dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

Entry: src={1 2 3 4 5 6 7 8}
 pred={1 0 1 1 0 0 1 0}
Exit: dest={8 2 2 2 5 6 6 8} dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);           // p1 = {00001100}
p2 = ConditionalStop(p1, kTF|kFT); // p2 = {00004060}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:      // i2 = {0 0 0 0 4 0 6 0}
p2 = 0;        // p2 = {0 0 0 0 0 0 0 0}
Loop2:
p2 = GeneratePredicates(p2,i2); // p2' = {1 1 1 1 0 0 0 0}
CF = 0, ZF = 0
if(!PLAST( )) goto Loop2      // p2" = {0 0 0 0 1 1 0 0}
CF = 0, ZF = 0    // p2'"= {0 0 0 0 0 0 1 1}
CF = 1, ZF = 0
```

From an initialized predicate p2 of all zeros, GeneratePredicates generates new instances of p2 that partition subsequent vector calculations into three sub-vectors (i.e., p', p", and p'"). This enables the hardware to process the vector in groups that avoid violating the data dependencies of the loop.

In FIG. 7A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 7B a diagram illustrating a progression of execution for Macroscalar vectorized program code of the loop of Example 1 is shown. In FIG. 7A and FIG. 7B, the values read from A[ ] are shown using leftward-slanting hash marks, while the values written to B[ ] are shown using rightward-slanting hash marks, and values for "r" or "s"

(depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 7B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 8A and FIG. 8B, diagrams illustrating one embodiment of the vectorization of program code are shown. FIG. 8A depicts the original source code, while FIG. 8B illustrates the vectorized code representing the operations that may be performed using the Macroscalar architecture. In the vectorized code of FIG. 8B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

| Program Code Loop 1 |
|---|
| j = 0;<br>for (x=0; x<KSIZE; ++x)<br>{<br>    if (A[x] < FACTOR)<br>    {<br>        j = A[x+j];<br>    }<br>    B[x] = j;<br>} |

Example 2B

| Program Code Loop 2 |
|---|
| j = 0;<br>for (x=0; x<KSIZE; ++x)<br>{<br>    if (A[x+j] < FACTOR)<br>    {<br>        j = A[x];<br>    }<br>    B[x] = j;<br>} |

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

1. Entry: pred={0 0 1 0 1 0 0 0}
2. Exit: dest={0 0 0 0 0 1 1 1}

FIG. 9A and FIG. 9B are diagrams illustrating embodiments of example vectorized program code. More particularly, the code sample shown in FIG. 9A is a vectorized version of the code in Example 2A (as presented above). The code sample shown in FIG. 9B is a vectorized version of the code in Example 2B. Referring to FIG. 9B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 9A and FIG. 9B, there exists a loop-carried dependency between iterations where the condition is true, and subsequent iterations, regardless of the predicate value for the later iterations. This is reflected in the parameters of the ConditionalStop instruction.

The sample program code in FIG. 9A and FIG. 9B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

---

Program Code Loop 3

---
```
for (x=0; x<KSIZE; ++x)
{
    r = C[x];
    s = D[x];
    A[x] = A[r] + A[s];
}
```
---

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards. The CheckHazardP instruction may be an embodiment of the hazard check instruction described previously.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

Entry: first={2 3 4 5 6 7 8 9} second={8 7 6 5 4 3 2 1} pred={1 1 1 1 1 1 1 1}

Exit: dest={0 0 0 0 3 2 1 0}

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

---

Entry Conditions: //DIV = {0 0 0 0 3 2 1 0}
    // p2 = {0 0 0 0 0 0 0 0}
p2 = GeneratePredicates(p2,DIV);  // p2 = {1 1 1 1 0 0 0 0}
P2 = GeneratePredicates(p2,DIV)  // p2 = {0 0 0 0 1 1 1 1}

---

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
    if(DIV[x] in List)
        Break from loop;
    else if(DIV[x]>0)
        Append <x> to List;
}
```

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0); //i2 = {0 0 2 0 2 4 0 0}
i3 = CheckHazardP(b,c,p0); //i3 = {0 0 1 3 3 0 0 0}
ix = VectorMax(i2,i3);    //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 10 is a diagram illustrating one embodiment of example vectorized program code. More particularly, the code sample shown in FIG. 10 is a vectorized version of the code in Example 3 (as presented above). Referring to FIG. 10, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 10, the hazard check is performed across the entire vector of addresses. In the general case, however, it is often necessary to hazard checks between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 11 a diagram illustrating one embodiment of example vectorized program code is shown. More particularly, the code sample shown in FIG. 11 is a vectorized Macroscalar version of the code in Example 4 (as presented above).

Example 4

Program Code Loop 4

```
j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 11, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above. The CheckHazard instruction may also be an embodiment of the hazard check instruction previously described.

Numerous variations and modifications will become apparent to those skilled in the art once the above disclosure is fully appreciated. It is intended that the following claims be interpreted to embrace all such variations and modifications.

What is claimed is:

1. A processor comprising:
an execution core configured to execute a vector instruction comprising: a first vector predicate operand that specifies active elements of a result vector of the vector instruction;
a second vector predicate operand that represents true/false results of a conditional expression; and
a source operand that specifies which combinations of true/false results in the second vector predicate are indicative of dependencies in one or more vector operations, wherein, responsive to executing the vector instruction,
the execution core is configured to generate the result vector of the vector instruction identifying which active vector elements are dependent on which other active vector elements in response to the true/false results and the source operand, wherein dependencies are detected only between active vector elements, and wherein a dependency is detected between a first active vector element and a nearest prior active vector element in response to a first combination in the true/false results between the first active vector element and the nearest prior active vector element being specified in the source operand, and wherein no dependency is detected between the first active vector element and the nearest prior active vector element in response to the first combination in the true/false results not being specified in the source operand, and wherein the dependency or no dependency is detected even in the event that one or more inactive elements are included between the first active vector element and the nearest prior active vector element as specified by the first vector predicate operand.

2. The processor as recited in claim 1, wherein no dependency is indicated for an initial active vector element in the result vector, even in the case that the initial active vector element is not an initial vector element in the result vector.

3. The processor as recited in claim 1, wherein the result vector includes an element position number for each active vector element in the vector that is dependent on another active vector element, and the element position number identifies an element vector position corresponding to the other active vector element.

4. The processor as recited in claim 3, wherein no dependency is indicated for a given active vector element in the result vector via a zero in the element vector position corresponding to the given active vector element.

5. The processor as recited in claim 4, wherein a zero is also stored in vector element positions of the result vector that corresponds to inactive vector elements.

6. The processor as recited in claim 1, wherein the result vector includes an identifier of a first vector element position corresponding to the nearest prior active vector element in response to detecting the dependency, wherein the identifier is in a vector element position corresponding to the first active vector element.

7. The processor as recited in claim 6, wherein the result vector includes a zero indicating no dependency in a second element vector position responsive to detecting no dependency.

8. The processor as recited in claim 1, wherein the combinations of true/false results include a transition between true and false in the result of the first active vector element and the nearest prior active vector element.

9. The processor as recited in claim 1, wherein the combinations of true/false results include a same true/false value for each of the first active vector element and the nearest prior active vector element.

10. A method comprising:
executing a vector instruction in a processor, wherein the vector instruction includes:
a first vector predicate operand that specifies active vector elements of a result vector of the vector instruction;
a second vector predicate operand that represents true/false results of a conditional expression; and
a source operand that specifies which combinations of true and false in the second vector predicate are indicative of dependencies in one or more vector operations; and
responsive to executing the vector instruction, generating the result vector of the vector instruction in the processor, wherein the result vector identifies which active vector elements are dependent on which other active vector elements, wherein the result vector is generated in response to the true/false results and the source operand, wherein dependencies are detected only between active vector elements, and wherein a dependency is detected between a first active vector element and a nearest prior active vector element in response to a first combination in the true/false results between the first active vector element and the nearest prior active vector element being specified in the source operand, and wherein no dependency is detected between the first active vector element and the nearest prior active vector element in response to the first combination in the true/false results not being specified in the source operand, and wherein the dependency or no dependency is detected even in the event that one or more inactive elements are included between the first active vector element and the nearest prior active vector element as specified by the first vector predicate operand.

11. The method as recited in claim 10, wherein the result vector includes an indication of no dependency for an initial active vector element, even in the case that the initial active vector element is not an initial element in the result vector.

12. The method as recited in claim 10, wherein the result vector includes an identifier of a first vector element position corresponding to the nearest prior active vector element in response to detecting the dependency, wherein the identifier is in a second vector element position corresponding to the first active vector element.

13. The method as recited in claim 10, wherein the result vector includes a zero indicating no dependency in a first element vector position responsive to detecting no dependency, wherein the first element vector position corresponds to the first active vector element.

14. The method as recited in claim 10, wherein the combinations of true/false results include a transition between true and false in the result of the first active vector element and the nearest prior active vector element.

15. The method as recited in claim 10, wherein the combinations of true/false results include a same true/false value for each of the first active vector element and the nearest prior active vector element.

16. A system comprising:
   a processor configured to execute a vector instruction having:
      a first vector predicate operand that specifies active elements of the result vector of the first vector instruction;
      a second vector predicate operand that represents true/false results of a conditional expression; and
      a source operand that specifies which combinations of true/false results in the second vector predicate are indicative of dependencies in one or more vector operation, wherein, responsive to executing the vector instruction, the processor is configured to generate a result vector of the vector instruction, the result vector identifying which active vector elements are dependent on which other active vector elements in response to the true/false results and the source operand, wherein dependencies are detected only between active vector elements, and wherein a dependency is detected between a first active vector element and a nearest prior active vector element in response to a first combination in the true/false results between the first active vector element and the nearest prior active vector element being specified in the source operand, and wherein no dependency is detected between the first active vector element and the nearest prior active vector element in response to the first combination in the true/false results not being specified in the source operand, and wherein the dependency or no dependency is detected even in the event that one or more inactive elements are included between the first active vector element and the nearest prior active vector element as specified by the first vector predicate operand; and
   a memory system coupled to the processor and configured to store a plurality of instructions including the first vector instruction.

* * * * *